United States Patent [19]
Adrianson et al.

[11] Patent Number: 5,670,197
[45] Date of Patent: Sep. 23, 1997

[54] LOW-ACID, HIGH-MOISTURE PROCESSED CHEESE SPREAD AND METHOD OF MAKING

[75] Inventors: Tim M. Adrianson, Oak Ridge; Alpheus I. Brown, Jr., Randolph; G. Curtis Busk, Jr., Rockaway, all of N.J.; Stephen A. Gunther, Bethlehem, Pa.; Karen D. Huether, Succasunna, N.J.; Joseph W. Mann, Escondido, Calif.; James K. Yoss, Denville, N.J.

[73] Assignee: Nabisco, Inc., Parsippany, N.J.

[21] Appl. No.: 536,406

[22] Filed: Sep. 29, 1995

[51] Int. Cl.$^6$ ............................................ A23C 19/10
[52] U.S. Cl. .................................. 426/582; 426/654
[58] Field of Search ............................ 426/582, 654

[56] References Cited

U.S. PATENT DOCUMENTS

| | | | |
|---|---|---|---|
| 3,502,481 | 3/1970 | Schaap et al. | 426/582 |
| 4,166,142 | 8/1979 | Chang | 426/583 |
| 4,346,117 | 8/1982 | Thompson et al. | |
| 4,382,971 | 5/1983 | Thompson | 426/582 |
| 4,584,199 | 4/1986 | Taylor. | |
| 4,597,972 | 7/1986 | Taylor. | |
| 5,304,387 | 4/1994 | Hine | 426/582 |

FOREIGN PATENT DOCUMENTS

| | | |
|---|---|---|
| 02303891 | 10/1992 | Japan. |
| 2141016 | 12/1984 | United Kingdom. |

OTHER PUBLICATIONS

Karahadian, C., et al., *J. Food Protec.* 48: 63–69 (1985).
Kauttner, D.A., et al., *J. Food Protec.* 42: 784–786 (1979).
Maas, M.R., et al., *Appl. Env. Microbiol.* 55: 2226–2229 (1989).
Tanaka, N., et al., *J. Food Protec.* 42: 787–789 (1979).
Tanaka, N., et al., *J. Food Protec.* 49: 526–531 (1986).

*Primary Examiner*—Helen Pratt

[57] ABSTRACT

High-moisture, high-pH, shelf-stable cheese spreads containing cheese, preferably a cheese having a pH of 5.4 or lower such as Swiss, Cheddar, American, mozarella, skim milk cheese, or cheese mixtures, water sufficient to provide a total moisture of from 51 to 58% and a pH of from 5.3 to 6.0 are preserved by adding sodium chloride, a phosphate salt, sodium citrate, and sodium lactate in sufficient amounts to maintain the composition free from the growth of *Clostridium botulinum* and the production of toxin by those organisms during room temperature storage for a period of at least 180 days, preferably 300 days. Some embodiments contain about 1 to 2% sodium citrate, about 1 to 2% sodium lactate, and a combined level of dibasic sodium phosphate and sodium chloride ranging between about 1.3 and 2.2%, and have a moisture content of 52 to 55%, and an overall pH of about 5.3 to 5.6.

20 Claims, 4 Drawing Sheets

LOW-ACID, HIGH-MOISTURE PROCESSED CHEESE SPREAD AND METHOD OF MAKING

TECHNICAL FIELD

The invention relates to a method for preparing an improved cheese spread of the low-acid, high-moisture type, and especially to one with an improved preservation system which enables the use of higher pH values and/or moistures than currently available in commercial products without rendering them susceptible to the production of toxins by microorganisms such as *Clostridium botulinum*.

Cheese spreads pose problems in preservation in addition to those of foods such as meat and vegetables. Unlike those other products, which can be heat processed if their pH and moistures are not low enough (e.g., pH<4.5 and $a_w$<0.85) to assure safety by simply aseptic packaging, cheese spreads will separate and lose other textural and flavor attributes if heated in the manner of other foods. Accordingly, it has been necessary to utilize moisture contents of about 52% or less, along with a number of other preservatives including salt, phosphate salts, and acids.

Because of these limitations, it has not been possible to utilize more moisture for, as a primary example, reduced-fat, shelf-stable cheese spreads.

There is a present need for a preservation system for use with processed cheese spreads which will enable the use of higher pH values and/or higher moistures.

BACKGROUND ART

The art of making and preserving processed cheese spreads for room temperature storage in hermetically-sealed containers has developed greatly in the past two decades, but there yet seem to be certain barriers in terms of moisture and pH which cannot be circumvented.

In the *Journal of Food Protection*, 1979, 42 (10) 784–786, D. A. Kautter, et al., reported that five non-refrigerated, pasteurized processed cheese spreads, considered shelf-stable, were studied for their ability to support growth and toxin production by spores of *Clostridium botulinum*, types A and B. On the basis of pH and water activity ($a_w$), Cheese with Bacon, Limburger, Cheez Whiz®, Old English, and Roka Blue cheese spreads were selected for the study. Sample pH ranged from 5.05 to 6.32 and $a_w$ from 0.930 to 0.953. Fifty jars of each cheese spread were inoculated with 24,000 spores each, and an additional 50 jars of the Cheese with Bacon spread received 460 spores each. The inoculum consisted of five type A and five type B strains in 0.1 ml of 0.85% NaCl. At 35° C., 46 jars of Limburger spread and 48 jars of the Cheese with Bacon spread which received the greater inoculum became toxic starting at 83 and 50 days, respectively. One jar of Cheese with Bacon spread which received 460 spores became toxic. The average toxicity of the Limburger was 3000 mouse LD/ml of extract as compared with 54 mouse LD/ml for the Cheese with Bacon spread. Results of this study were considered in determining whether these cheese spread products should be treated as low-acid canned foods under the Good Manufacturing Practice Regulation of the FDA. See also, D. A. Kautter, et al., Abstracts of the Annual Meeting of the American Society for Microbiology, 1978, 78, 192.

N. Tanaka, et al., in the *Journal of Food Protection*, 1979, 42 (10) 787–789, reported on a study wherein pasteurized processed cheese spread with pimentos, packaged in glass jars, inoculated during processing with 1000 spores per gram, developed neither gas nor toxin at 52 or 54% moisture when sodium phosphate was used as the emulsifier. When, however, sodium citrate was the emulsifier, the product developed gas at 52% moisture and became toxic at 54%. At 58% moisture, the product became gassy and toxic with either emulsifier. It was concluded that since the product is commercially manufactured at 52% moisture with phosphate emulsifier, a substantial margin of safety existed.

In a later paper, Tanaka, et al., reported that sodium chloride and disodium phosphate inhibited butulinal toxin production with similar effectiveness in tests of a series of process cheese spreads having various levels of sodium chloride, disodium phosphate, moisture and pH that were challenged with *Clostridium botulinum* types A and B and typically incubated at 30° C. for 42 weeks (*Journal of Food Protection*, 1986, 49 (7) 526–531). The addition of 0.25% lactic acid helped inhibit toxin formation, but the observed inhibition was largely attributed to the reduction of pH. The investigators concluded from the study that no single factor is responsible for the safety of unsterilized pasteurized process cheese spreads, but safer products had lower moisture, higher NaCl and phosphate concentrations, and lower pH's.

In U.S. Pat. No. 4,346,117, Thompson, et al., disclosed processing corned beef and smoked poultry, to make them more resistant to the outgrowth of *Clostridium botulinum* and the formation of enterotoxins during storage. The products contained less than 120 ppm of alkali metal nitrite salt and an effective amount of hypophosphorous acid or one of its water soluble non-toxic salts. Satisfactory preservation of meat was said to be achieved with reduced amounts of nitrite. In a related application (Eur. Pat. Ap. Pub. No. 66170), botulinal toxin inhibition in reduced-sodium processed American cheese foods and spreads (and high carbohydrate food products having a ratio of carbohydrate and protein to fat greater than 1) was reported by adding 1000–3000 ppm of hypophosphorous acid or its non-toxic water-soluble salts and, optionally, up to 52 ppm of sodium nitrite.

Similarly, in the *Journal of Food Protection*, 1985, 48 (1) 63–69, C. Karahadian, et al, described tests on moderately-reduced (about 55%) and highly-reduced sodium (about 75%) processed cheese foods and spreads prepared from Cheddar cheese. The plastic, but pourable processed cheese samples were incubated at 62° C. with 1 or 1000 spores/g of a mixed strain *Clostridium botulinum* spore suspension, held at 4.4° C. for 24 hours, then at 30° C. for 84 days. With an inoculum of 1000 spores/g, botulinal toxin was not detected in moderately-reduced sodium cheese foods and spreads (pH 5.15–5.26) containing δ-gluconolactone. With highly-reduced sodium spreads and foods, the presence or absence of toxin was not always predictable, although δ-gluconolactone played an important role in delaying toxinogenesis. When five emulsifiers were used individually at 2.5% in screening tests, samples emulsified with disodium phosphate and, possibly, trisodium citrate showed some inhibition of toxin formation; the three potassium emulsifiers tested were ineffective in inhibiting toxin formation.

M. R. Maas, et al., reported delays in toxin production by *Clostridium botulinum* in cook-in-bag turkey products containing 1.4% sodium chloride, 0.3% sodium phosphate, and 0 to 3.5% sodium lactate (*Applied and Environmental Microbiology*, 1989, 55, 2226–2229). Though the products were cooked by immersion in heated water prior to incubation at 27° C. for up to 10 days, processed turkey containing 0, 2.0, 2.5, 3.0, or 3.5% sodium lactate was toxic after 3, 4 to 5, 4 to 6, 7, or 7 to 8 days, respectively.

In addition to the more traditional preservatives, the antibotulinal effectiveness of nisin in pasteurized process cheese spreads has been investigated. In the United States, nisin is generally recognized as safe for use in some pasteurized cheese spreads to prevent both spore outgrowth and toxin production by *Clostridium botulinum*. In other countries, nisin has been used for a number of applications, including extension of the shelf life of dairy products and prevention of spoilage of canned foods by thermophiles. E. B. Somers and S. L. Taylor reported in the *Journal of Food Protection*, 1987, 50 (10) 842–848, on work with pasteurized processed cheese spreads having moisture levels of 52–57% with 0–2.0% added NaCl, disodium phosphate levels of 1.4–2.5% and nisin levels of 0–250 ppm that were inoculated with about 1000 spores/g (except in one experiments wherein the spore levels were varied between 10 and 1000 spores/g). The products were incubated at 30° C. for up to 48 weeks. Nisin was an effective antibotulinal agent. Addition of nisin allowed formulation of the processed cheese spread with reduced sodium levels (e.g., addition of 1.4% disodium phosphate and no NaCl) or slightly higher moisture levels (55–57%) compared with typical commerical pasteurized process cheese spread. Higher levels of nisin (100 and 250 ppm) were required to prevent outgrowth of botulinal spores in the highest moisture or most reduced sodium samples. In a sample having 52% moisture, prepared with 2.5% disodium phosphate and no added NaCl, 12.5 ppm nisin completely prevented outgrowth and toxin production by *C. botulinum*. See also GB Patent 2,141,016 A to Taylor, which suggested adding 2,000 to 10,000 I.U. nisin per gram of cheese.

In a related U.S. patent (U.S. Pat. No. 4,584,199), S. L. Taylor described a process for inhibiting outgrowth of *Clostridium botulinum* spores and subsequent toxin formation in high-moisture, pasteurized processed cheese spreads. The cheese was a blend of American cheese, dried skim milk and whey solids. Test batches were produced containing 58% moisture, 1.45% Na$_2$HPO$_4$ and 1.2% NaCl, with or without nisin at levels of 12.5, 100 or 250 ppm At the high level, nisin completely prevented outgrowth and toxin production by *C. botulinum*. At 100 ppm, nisin severely limited outgrowth and toxin production, but 12.5 ppm was ineffective.

In U.S. Pat. No. 4,597,972, S. L. Taylor discloses a process for controlling the growth of *Clostridium botulinum* spores and production of botulinum toxin in a food products comprises adding nisin or a nisin-producing culture to the food. The disclosure concerned foods other than high moisture content pasteurized process cheese products, such as tomato, meat, fish, poultry products. The nisin may be used together with other agents, e.g. nitrite or sorbate.

BRIEF DESCRIPTION OF THE FIGURES

The invention will be better understood and its advantages will be better appreciated from the following detailed description, especially when read in connection with the accompanying figures which summarize data collected in the performance of tests outlined in Examples 1 and 2. In the drawings, open squares indicate freedom from toxin production for the entire length of the study and solid squares indicate samples in which toxins were produced.

DISCLOSURE OF THE INVENTION

It is an object of the invention to provide a method for preparing a low-acid, shelf-stable, processed cheese spreads with improved ability to resist the production of toxins by spores of *Clostridium botulinum*.

It is another object of the invention to provide low-acid, shelf-stable, processed cheese spreads which have moisture contents above those available in current commercial products.

It is another object of the invention to provide shelf-stable, processed cheese spreads having milder, less-acid flavors than those currently available.

These and other objects are realized by the present invention which provides a method for preserving a high-moisture, high-pH, shelf-stable spread composition containing cheese by adding to the formulation a preservation system containing sodium chloride, a phosphate salt, sodium citrate, and sodium lactate in sufficient amounts to maintain the composition free from the growth of *Clostridium botulinum* and the production of toxin by those organisms during room temperature storage for a period of at least 180 days, and adjusting the water content so that the total moisture in the final composition ranges from about 51% to about 58% and adjusting the pH from about 5.3 to about 6.0.

In some embodiments, shelf-stable cheese spread formulations of the invention have a moisture content of 52 to 55%, contain 1 to 2% sodium citrate, about 1 to 2% sodium lactate, and a combined level of dibasic sodium phosphate and sodium chloride ranging between about 1.3 and 2.2%, and exhibit an overall pH of about 5.4 to 5.8.

INDUSTRIAL APPLICABILITY

This invention is based upon the finding that a preservation system comprising phosphate, lactate, citrate, and salt can be used to prepare shelf-stable, high-moisture, low-acid cheese spread compositions.

The invention will be described below with specific reference to a preferred embodiment wherein a cheese spread having a moisture content of 52 to 56% and a pH of from 5.4 to 5.8 is produced which is stable against the production of toxins from spores of *Clostridium botulinum* when stored in moisture-impermeable packaging at room temperature for a period of at least 180 days, and preferably at least 300 days. The term "room temperature" is defined to mean a temperature within the range of from 20° to 25° C. The typical moisture-impermeable packaging consists of glass jars with snap-on metal lids, but can be of any suitable material including plastic tubes or tubs, as well as pressurized metal cans with dispensers. Preservation is achieved without the addition of nisin.

The type of cheese will affect the ability of the processed cheese spread to resist the production of toxins from the spores of *Clostridium botulinum*. This is principally due to the pH and the salt levels. For example, it is preferred to start with cheeses having a pH of no higher than about 5.4, preferably about 5.2, and a salt (sodium chloride) level of from about 1 to about 2%. This percentage and those used throughout this description are by weight and based on the weight of the formulation at the indicated stage of processing. Among the types of cheese preferred are Cheddar, Swiss, American, reduced-fat cheeses, part-skim mozzarella, skim milk cheeses, and mixtures thereof. Where the pH and salt levels do not meet the above target levels, it is desired to adjust the amounts of added acid or salt to meet these targets. Likewise, where the cheese contains salt, added levels added can be correspondingly, as in the case of Cheddar cheese, which typically contains 1.4 to 1.5% salt.

The processed cheese spreads made according to the method of the invention will also contain an emulsifier of a type typically employed to maintain the desired smooth texture through processing and storage. The use of dibasic sodium phosphate ($Na_2HPO4.2H_2O$) is preferred at a level of at least 0.6% at a level to give a combined level of this compound and sodium chloride of from 1.3 to 2.2%. Sodium citrate can be employed as an adjunct emulsifier and still obtain the desired degree of stability.

At pH values of up to 5.8, 1.5% of the phosphate emulsifier is effective in preventing the production of toxins by spores of *Clostridium botulinum* when employed with sodium chloride at the indicated level and sodium citrate (as the dihydrate) as an adjunct emulsifier at a sufficient level. It is contemplated to employ the sodium citrate at a level of from about 1.0 to about 2.0%, testing in the examples being done at 1.23%. It has also been determined that samples unstable at 0.6% phosphate can be increased in stability to prevent the production of the noted toxins by the addition of sodium lactate, e.g., at a level of about 1.0 to 2.0%, 1.3% being specifically tested.

The pH of the preferred products is within the range of from 5.2 to 5.8, with the exact level being selected, not only for preservation, but also to achieve the desired flavor in the product. It is an advantage of the method of the invention that the pH can be above 5.4 without rendering the formulation susceptible to the production of the noted toxins. This is of particular advantage when it is desired to produce cheeses such as reduced-fat processed cheeses (e.g., similar to cream cheese) and the like which have relatively mild, or at least non-acid flavors and, in some cases, require higher pH values to be suitably spreadable.

The cheese spreads are made as known to the art other than for the use of the newly-discovered effective preservation system and the method for its use. In this regard, the procedure of Example 1 is effective as are those of the above-noted references. Typically, the procedure will entail mixing liquid ingredients such as cream, water, milk, and the like, with soluble solids such as salt, emulsification agents such as the phosphates or citrates, colorants, flavorants, spices, any sugars or dextrins, gums or other thickeners, and possibly antimycotics such as potassium sorbate or the like. The resulting mixture is blended and heated while the cheese is added, preferably in grated form with the aid of a scraped-surface mixing kettle. The ingredients are agitated until the mixture is smooth and any solid inclusions such as pimentos, bacon, or the like, are added in known fashion.

Following mixing of the ingredients, the cheese mixture is heated to a processing temperature of about 190° F. and the ingredients blended until smooth. For flavor enhancement, the temperature is typically held at the processing temperature for at least a minute or two prior to filling and cooling. Specific instructions for the preparation of cheese spreads according to the invention are given in greater detail in the examples that follow.

An advantage of the invention is that a shelf-stable cheese spread product exhibiting high moisture and high pH can be made by the simple process of judicious selection of added salts in the preservation system. Cheese spread compositions made according to the method of the invention exhibit good organoleptic characteristics as well as freedom from toxin production after storage, with the range of cheeses expanded over prior art products.

The following examples are presented to further explain and illustrate the invention and are not to be taken as limiting in any regard. Unless otherwise indicated, all parts and percentages are given based on the weight of the composition at the indicated stage of processing.

EXAMPLE 1

A cheese spread was prepared by mincing about 65 to 65.5% Cheddar cheese and processing in a "silent cutter" until a contiguous paste was formed. Sorbic acid (about 0.09–0.11%), carageenan (about 0.07–0.08%), and yeast extract (about 0.35–0.4%) were sprinkled into the mass, then water (about 7–8%) and heavy cream (about 13–14%) were added, followed by lactic acid (about 0.85–0.9%), NFDM (about 6.8–6.9%), and whey (about 5–5.5%), and the mixture was blended together until homogeneous. The temperature of the blend following processing in the silent cutter was 76° F.; temperatures remained in the high 70's during processing and filling, after which the product was immediately transferred to a 38°–42° F. cooler. The prepared cheese base had a pH of 4.9 and a moisture content of 39.8%.

The pasteurized process cheese spread base prepared as above was transported frozen in three-pound blocks. The cheese was stored at –20° C. then thawed at 4° C. before usage. Batches (1500 g final weight after addition of moisture) were prepared by heating ca. 1360 g cheese base in a steam-jacketed cheese cooker until slightly melted and easily mixed. About one third of the moisture was added as water, followed by the addition of the sodium chloride, sodium phosphate and sodium citrate and blended without steam until the mixture was homogeneous. When the mixture was smooth, an additional one third of water volume and the appropriate amount of 6N HCL or 5M NaOH was added to adjust the pH. The product exhibited no processing problems, and control product incubated in the absence of *Clostridium botulinum* as set out below exhibited good viscosity, taste and mouthfeel.

Product was heated with agitation to 88° C. (190° F.) and held for 2 min before a 10-strain mixture of *Clostridium botulinum* spores (5 type A and 5 type B, all proteolytic) was added at a rate of ca. 1000 spores/g. The sauce was held at 88° C. for an additional 1 min, then quickly poured into sterile 20 ml glass vials (29×60 mm, Wharton 225288) and capped. All samples were stored under anaerobic conditions (gas mixture of 80% $CO_2$, 10% $H_2$ and 10% $N_2$ in a BBL anaerobe jar) at 30° C. (abuse conditions) and assayed (5 per sampling time) at 0, 4, 8, 12, 16, 24, 32, 40 and 48 weeks postinoculation for pH and botulinal toxin using the mouse bioassay (FDA Bacteriological Analytical Manual). Testing of a trial was discontinued when botulinal toxin was detected in at least one sample for two sampling times. Moisture, pH and *C. botulinum* spore levels were determined in triplicate at 0-time and at the end of incubation at 48 weeks. Analyses for sodium chloride, citrate and phosphate were done in duplicate at 0-time. Methods used for these determinations included:

| | |
|---|---|
| 1. direct pH | Orion 816 combination pH probe, Corning 140 pH meter |
| 2. aerobic plate count | FDS Bacteriological Manual, 6th ed. |
| 3. moisture | AOAC 926.08, 15th ed. |
| 4. sodium chloride | AOAC 935.43, 15th ed. |
| 5. phosphate | atomic absorptin for phosphorus content by outside contract laboratory; additional samples sent to Nabisco for analysis |
| 6. citrate | AOAC 976.15, 15 ed; colorimetric method |
| 7. lactate | analysis by center for Dairy Research, University of Wisconsin-Madison |
| 8. sorbate | analysis by outside contract laboratory |
| 9. *C. botulinum* spores | Most Probable Number (MPN) method FDA Bacteriological Manual, 6th ed. |

Figure 1:
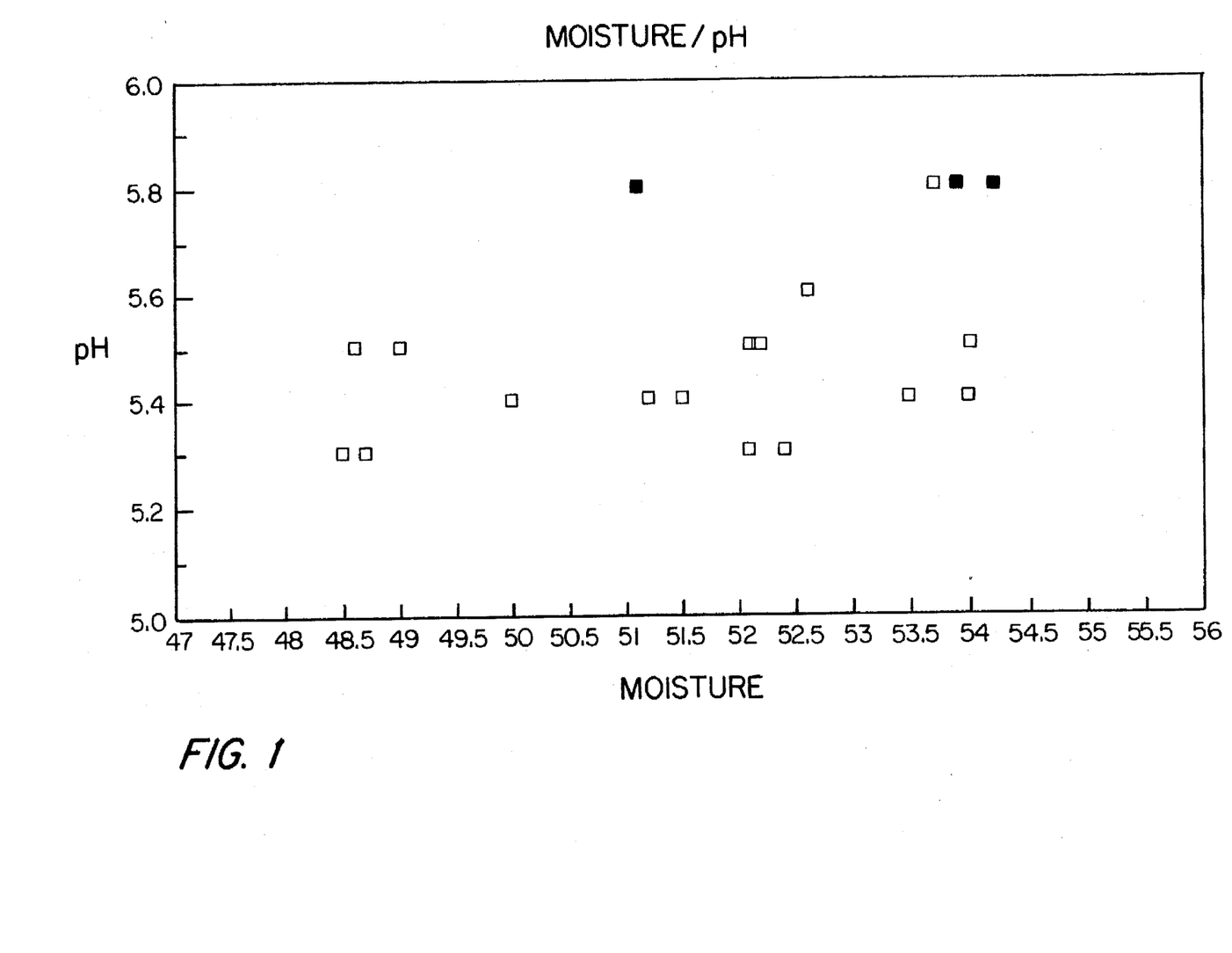
FIG. 1 is a graph showing the relationship between moisture and pH in the test results.
Figure 2:
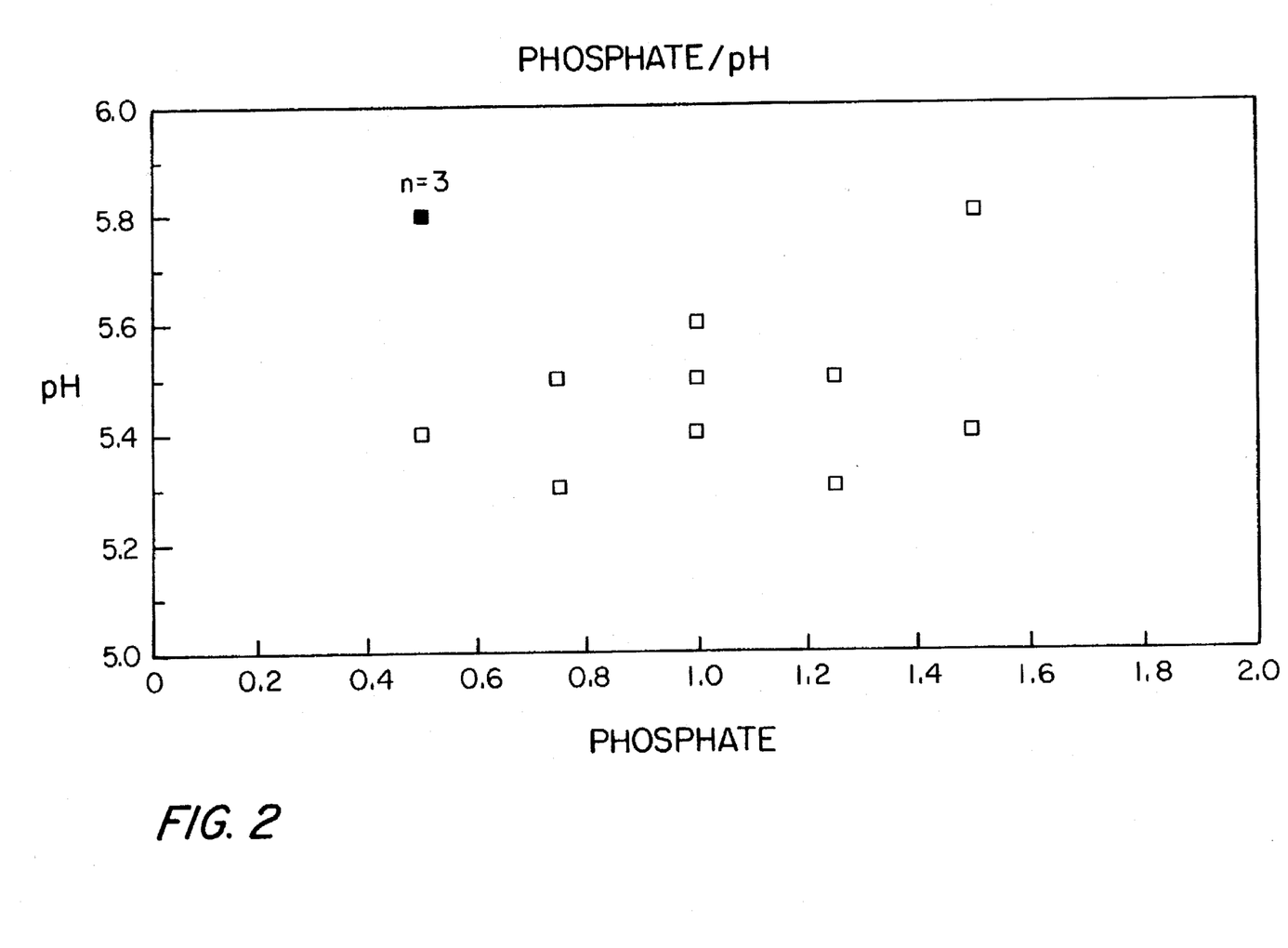
FIG. 2 is a graph showing the relationship between phosphate and pH in the test results.
Figure 3:
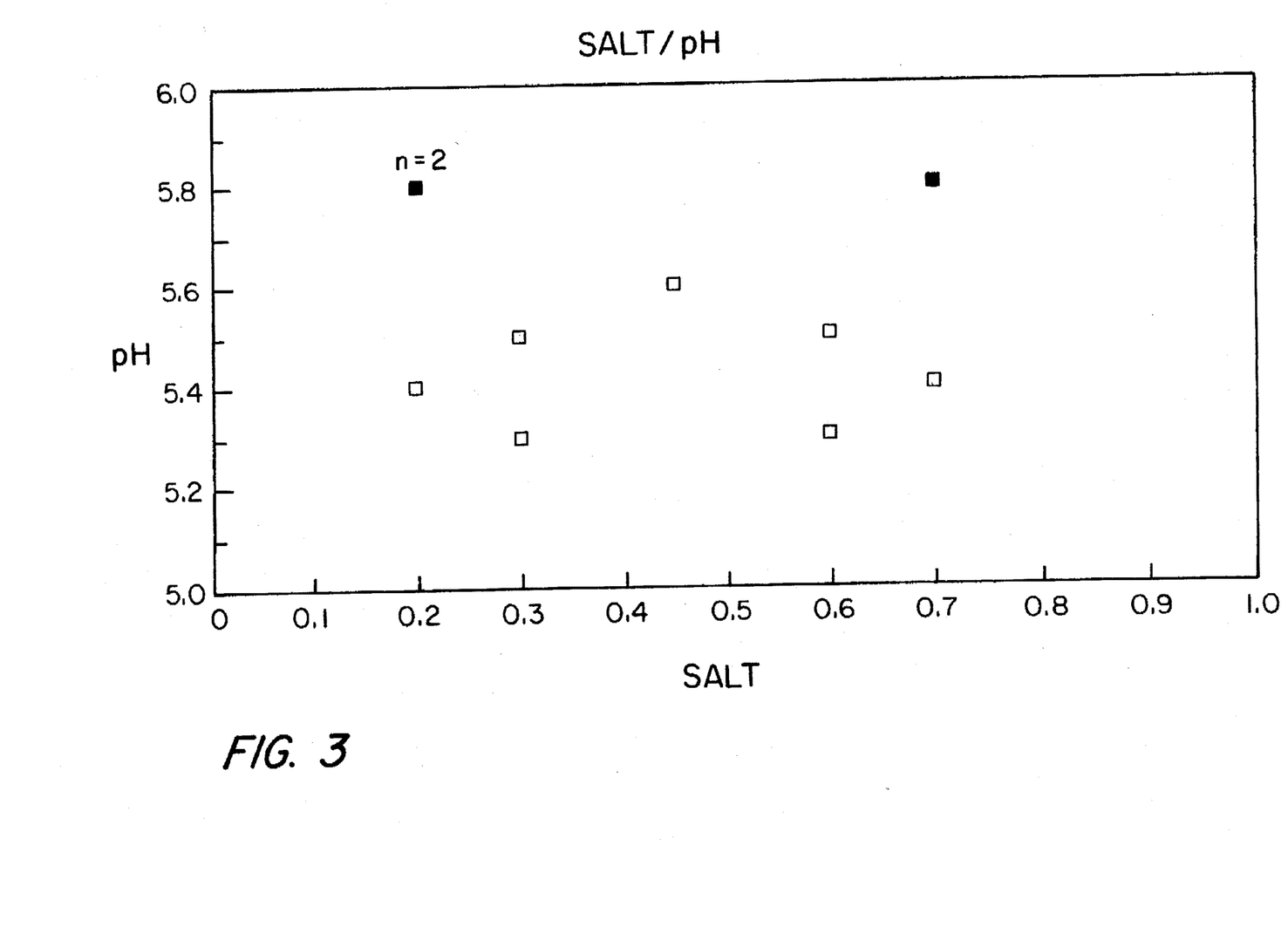
FIG. 3 is a graph showing the relationship between salt (sodium chloride) and pH in the test results.
Figure 4:
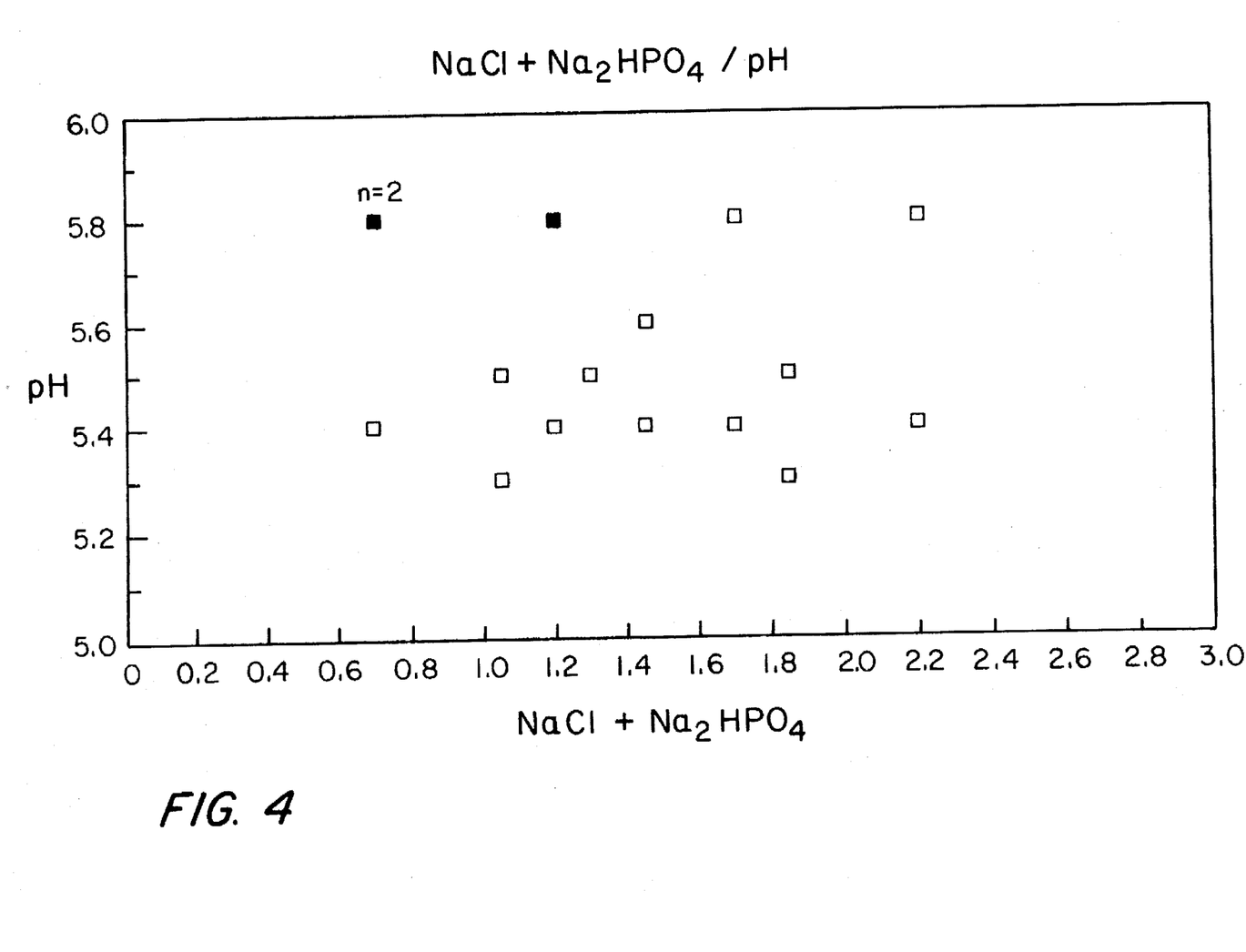
FIG. 4 is a graph showing the relationship between the combined weight of salt and phosphate, and pH in the test results.

Preliminary experiments summarized in FIGS. 1 to 4 were run to determine the relationship of salt levels and pH in the test results. The graphs show the relationship between moisture and pH (FIG. 1), between phosphate and pH (FIG. 2), between salt and pH (FIG. 3), and between the combined weight of salt and phosphate and pH (FIG. 4). The data show a complex relationship, but high-moisture, high-pH shelf-stable cheese spread compositions can be achieved by appropriate selection of levels of salt and phosphate in the preservation system.

The samples listed in Tables 1a and 1b (below) were then tested. Note that, in contrast to trial 11, which exhibited no botulinal toxicity in samples exhibiting a moisture content of about 54%, a phosphate level of 0.5%, a citrate level of 1.23%, a sodium chloride level of 0.2%, and a lactate level of 1.3% in a product having a pH of 5.8 originally, the trial 4 incubation having the same ingredients and properties except no lactate yielded toxicity at 8 weeks, which was confirmed at 12 weeks.

The trial 6 and 8 incubations, which had initial products exhibiting a desirable moisture content of about 54% and a pH of 5.4 and 5.8, respectively, also exhibited no toxicity using phosphate levels of 1.5% and citrate levels of 1.23 in both, and sodium chloride levels of 0.2 and 0.7, respectively, whereas, in trial 4, toxcity was observed using 0.5%

TABLE 1b

Plate count[a] and analyzed values for phosphate, sodium chloride and citrate[b] of processed cheese spreads.

| Trial | Plate count | % Phosphate[c] | % NaCl | % Citrate |
|---|---|---|---|---|
| 1. | $1.1 \times 10^3$ | 1.3 | 1.44 | 1.03 |
| 2. | $1.4 \times 10^3$ | 1.2 | 1.83 | 0.89 |
| 3. | $1.2 \times 10^3$ | 1.3 | 1.76 | 1.23 |
| 4. | $1.1 \times 10^3$ | 1.2 | 1.46 | 2.29 |
| 5. | $1.2 \times 10^3$ | 1.7 | 1.87 | 1.42 |
| 6. | $8.4 \times 10^2$ | 1.6 | 1.49 | 1.91 |
| 7. | $1.2 \times 10^3$ | 1.8 | 1.33 | 1.55 |
| 8. | $7.5 \times 10^2$ | 1.7 | 1.82 | 1.07 |
| 9. | $1.3 \times 10^3$ | 1.5 | 1.60 | 1.14 |
| 10. | $1.7 \times 10^3$ | 1.5 | 1.60 | 1.14 |
| 11. | $7.2 \times 10^2$ | 1.2 | 1.58 | 0.86 |
| Base[c] | ND[d] | 1.3 | ND | 0.24 |

[a]Average results for three samples.
[b]Average results for two samples.
[c]Other analyses results included % sorbate, 0.089%; % lactic acid
[d]ND, not determined.

phosphate. The trial 10 results also show no toxicity in a product having an original moisture of 54% and a pH of 5.5, where the incubation was carried out in the presence of 1.0% phosphate, 1.23% citrate, and 0.3% sodium chloride.

The results clearly show that manipulation of these parameters can yield to a stable cheese product exhibiting a relatively high moisture content of about 54% and a relatively high pH of 5.4 to 5.8.

EXAMPLE 2

The procedures of Example 1 were repeated, but this time the test formulations are summarized in Tables 2a and 2b.

TABLE 1a

Summary of moistures, pH, botulinal toxin production, *C. botulinum* MPN, and added levels[a] of citrate, NaCl, phosphate of processed cheese sauce inoculated with *C. botulinum* and incubated at 30° C. for 48 weeks.

| Trial | Original % Moisture/pH | Final % Mositure/pH | Added % Phosphate | Citrate | NaCl | Lactate | Botulinal Toxicity | Initial MPN (spores/g) | Final MPN (spores/g) |
|---|---|---|---|---|---|---|---|---|---|
| 1 | 51.5/5.4 | 51.3/5.3 | 0.5 | 1.23 | 0.2 | — | 1 vial toxic wk 40 | 473 | 117 |
| 2 | 53.5/5.4 | 52.4/5.3 | 0.5 | 1.23 | 0.7 | — | 0[b] | 87 | 635 |
| 3 | 51.1/5.8 | ND[c] | 0.5 | 1.23 | 0.7 | — | toxic wk 16, 32 | 407 | ND |
| 4 | 54.2/5.8 | ND | 0.5 | 1.23 | 0.2 | — | toxic wk 8, 12 | 167 | ND |
| 5 | 51.2/5.4 | 50.2/5.3 | 1.5 | 1.23 | 0.7 | — | 0 | 2,267 | 133 |
| 6 | 54.0/5.4 | 53.9/5.2 | 1.5 | 1.23 | 0.2 | — | 0 | 2,667 | 49 |
| 7 | 51.1/5.8 | 50.32/5.6 | 1.5 | 1.23 | 0.2 | — | 0 | 1,533 | 88 |
| 8 | 53.7/5.8 | 53.2/5.6 | 1.5 | 1.23 | 0.7 | — | 0 | 1,500 | 45 |
| 9 | 52.6/5.6 | 51.9/5.4 | 1.0 | .1.23 | 0.45 | — | 0 | 340 | 19 |
| 10 | 54.0/5.5 | 52.5/5.3 | 1.0 | 1.23 | 0.3 | — | 0 | 3,533 | 97 |
| 11 | 53.7/5.8 | 53.0/5.4 | 0.5 | 1.23 | 0.2 | 1.3 | 0 | 3,200 | 18 |

[a]Percentages are reported on an anhydrous basis of a sodium salt.
[b]0, no toxic samples detected.
[c]ND, not determined.

TABLE 2a

Summary of moistures, pH, botulinal toxin production, C. botulinum MPN, and added levels[a] of citrate, NaCl, phosphate of processed cheese sauce inoculated with C. botulinum and incubated at 30° C. for 48 weeks.

| Trial | Original % Moisture/pH | Final % Moisture/pH | Added % Phosphate | Citrate | NaCl | Botulinal Toxicity | Initial MPN (spores/g) | Final MPN (spores/g) |
|---|---|---|---|---|---|---|---|---|
| 1  | 48.5/5.3 | 47.4/5.1 | 0.75 | 1.23 | 0.3  | 0[b]           | 247  | 76  |
| 2  | 52.1/5.3 | 50.2/5.2 | 0.75 | 1.23 | 0.3  | 0              | 533  | 6.7 |
| 3  | 48.6/5.5 | 47.8/5.3 | 0.75 | 1.23 | 0.3  | 0              | 347  | 8   |
| 4  | 52.1/5.5 | 50.5/5.2 | 0.75 | 1.23 | 0.3  | 0              | 360  | 5.3 |
| 5  | 48.7/5.3 | 47.1/5.2 | 1.25 | 1.23 | 0.6  | 0              | 87   | 44  |
| 6  | 52.4/5.3 | 52.0/5.2 | 1.25 | 1.23 | 0.6  | 0              | 620  | 173 |
| 7  | 49.0/5.5 | 47.2/5.3 | 1.25 | 1.23 | 0.6  | 0              | 133  | 25  |
| 8  | 52.2/5.5 | 51.1/5.3 | 1.25 | 1.23 | 0.6  | 0              | 487  | 60  |
| 9  | 50.0/5.4 | 49.5/5.2 | 1.0  | 1.23 | 0.45 | 0              | 407  | 180 |
| 10 | 50.1/5.5 | 49.5/5.3 | 1.20 | 1.23 | 0.45 | 0              | 1027 | 220 |
| 11 | 53.9/5.8 | ND[c]    | 0.5  | 1.23 | 0.2  | toxic wk 4, 8  | 887  | ND  |

[a]Percentages are reported on an anhydrous basis of a sodium salt.
[b]0, no toxic samples detected.
[c]ND, not determined.

TABLE 2b

Plate count[b] and analyzed values[a] for sodium chloride[c] and citrate[c] of processed cheese spreads.

| Trial | Plate count | % NaCl | % Citrate |
|---|---|---|---|
| 1.   | $5.7 \times 10^2$ | 1.99 | 1.11 |
| 2.   | $5.5 \times 10^3$ | 1.73 | 1.53 |
| 3.   | $6.0 \times 10^3$ | 1.77 | 1.14 |
| 4.   | $5.6 \times 10^3$ | 2.04 | 1.03 |
| 5.   | $6.1 \times 10^2$ | 2.15 | 1.00 |
| 6.   | $7.4 \times 10^2$ | 2.12 | 1.12 |
| 7.   | $6.4 \times 10^2$ | 1.82 | 1.29 |
| 8.   | $6.1 \times 10^2$ | 1.82 | 1.29 |
| 9.   | $7.1 \times 10^3$ | 1.61 | 1.07 |
| 10.  | $1.0 \times 10^3$ | 1.61 | 1.17 |
| 11.  | $1.0 \times 10^3$ | 1.76 | 1.09 |
| Base | ND[d]             | 1.54 | 0.35 |

[a]Phosphate analysis results not known.
[b]Average results for three samples; values in CFU/g.
[c]Average results for two samples.
[d]ND, not determined.

Note that the results confirm the findings set out in Example 1 above. In contrast to trial 11 of Example 1, which exhibited no botulinal toxicity in samples exhibiting a moisture content of about 54%, a phosphate level of 0.5%, a citrate level of 1.23%, a sodium chloride level of 0.2%, and a lactate level of 1.3%, trial 11, which had the same ingredients except for the sodium lactate, was toxic at 4 (confirmed at 8 weeks).

Also as observed in Example 1, products having original moisture contents of 52.1 to 52.4% and a pH of 5.5 exhibited no botulinal toxicity if the cheese products were incubated in the presence of 0.75% phosphate, 1.23% citrate, and 0.3% sodium chloride (trials 2 and 4) or 1.25% phosphate, 1.23% citrate, or 0.6% sodium chloride (trials 6 and 8). At certain concentration levels, a preservation system containing sodium chloride, a phosphate salt, sodium citrate, and, preferably, sodium lactate yield superior results in processed cheese spreads exhibiting a relatively high moisture level (over 52%) and a relatively high pH (5.4 or higher).

The above description is intended to enable the person skilled in the art to practice the invention. It is not intended to detail all of the possible modifications and variations which will become apparent to the skilled worker upon reading the description. It is intended, however, that all such modifications and variations be included within the scope of the invention which is defined by the following claims. The claims are meant to cover the indicated elements and steps in any arrangement or sequence which is effective to meet the objectives intended for the invention, unless the context specifically indicates the contrary.

We claim:

1. A method for preserving a high-moisture, high-pH, shelf-stable spread composition containing cheese comprising
    adding to the formulation a preservation system comprising sodium chloride, at least about 0.6% of a phosphate salt, sodium citrate, and sodium lactate in sufficient amounts relative to one another to maintain the composition free from the growth of Clostridium botulinum and the production of toxin by those organisms during room temperature storage for a period of at least 180 days, and
    adjusting the water content so that the total moisture in the final composition ranges from about 51% to about 58% and adjusting the pH from about 5.3 to about 6.0.

2. A method according to claim 1 wherein the composition is adjusted to have a pH no higher than about 5.4.

3. A method according to claim 1 wherein the cheese in the composition is selected from the group consisting of Swiss, Cheddar, American, mozarella, skim milk cheese, and mixtures thereof.

4. A method according to claim 1 wherein the final preserved cheese composition comprises a phosphate salt concentration that ranges from about 1 to 1.5%, a sodium chloride concentration that ranges from about 0.35 to 0.55%, and a lactate concentration that ranges from about 1 to 2.0%.

5. A method according to claim 4 wherein the phosphate salt is dibasic sodium phosphate and its concentration is about 1.2%, the sodium chloride concentration is about 0.45, the citrate concentration is about 1.2%, and the lactate concentration is about 1.3%.

6. A method according to claim 1 wherein the moisture ranges from about 52% to 55%.

7. A method according to claim 1 wherein the pH ranges from about 5.5 to 5.8.

8. A method according to claim 1 wherein the preservation system maintains the composition free from Clostridium botulinum toxin during room temperature storage for at least 300 days.

9. A method for preserving a shelf-stable cheese spread composition containing cheese and water, comprising incorporating into the composition a preservation system containing, as a final concentration in the composition, about 1 to 2% sodium citrate, about 1 to 2% sodium lactate, and a combined level of dibasic sodium phosphate and sodium chloride ranging between about 1.3 and 2.2%, and adjusting the pH of the composition to about 5.2 to 5.9 and the moisture content to about 52 to 58%, so that the composition can be stored at room temperature for at least about 180 days without growth of *Clostridium botulinum*.

10. A method according to claim 9 wherein the pH is about 5.4 to 5.8.

11. A method according to claim 9 wherein the pH is about 5.2 to 5.4.

12. A method according to claim 9 wherein the moisture content ranges from about 52% to 55%.

13. A method according to claim 9 wherein the cheese in the composition is selected from the group consisting of Swiss, Cheddar, mozarella, skim milk cheese, and mixtures thereof.

14. A method according to claim 13 wherein the cheese is Cheddar.

15. A method according to claim 9 wherein the composition contains at least about 0.6% dibasic sodium phosphate and at least about 1.2% sodium lactate.

16. A method according to claim 9 wherein the cheese has a pH of 5.4 or lower and the salt concentration in the final composition ranges from about 0.35% to 0.55%, the phosphate concentration ranges from about 1% to 1.4%, the citrate level ranges from about 1% to 1.5%, and the lactate level ranges of about 1 to 1.5%, and the composition can be stored at room temperature for at least about 180 days without growth of *Clostridium botulinum.*

17. A cheese spread composition made according to the method of claim 9.

18. A cheese composition comprising cheese having a pH of 5.4 or lower, sufficient water to provide a moisture content of 52 to 55%, about 1 to 2% sodium citrate, about 1 to 2% sodium lactate, and a combined level of dibasic sodium phosphate and sodium chloride ranging between about 1.3 and 2.2%, and exhibiting an overall pH of about 5.4 to 5.8.

19. A composition according to claim 18 having a salt concentration varying between about 0.35 and 0.55%, a phosphate concentration varying between about 1 and 1.4% a citrate level varying between about 1 to 1.5%, and a lactate level of about 1 to 1.5% so that the composition can be stored at room temperature for at least about 180 days without growth of *Clostridium botulinum.*

20. A composition according to claim 19 wherein the cheese is selected from the group consisting of Cheddar, Swiss, American, mozarella, skim milk cheese, and mixtures thereof.

* * * * *